Patented Mar. 31, 1936

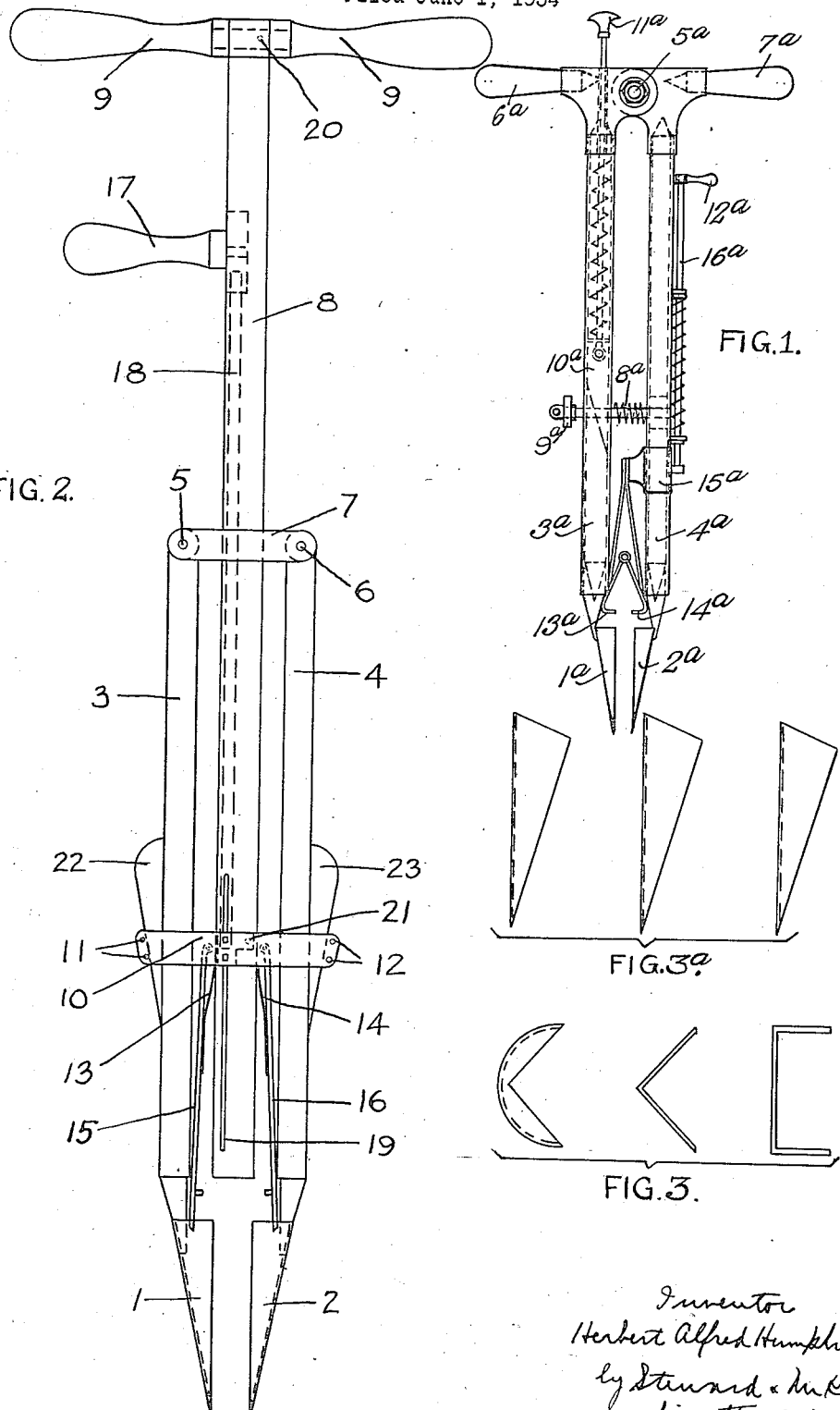

2,035,967

UNITED STATES PATENT OFFICE 2,035,967

APPARATUS FOR EXTRACTING WEEDS, ROOTS, OR THE LIKE FROM THE GROUND

Herbert Alfred Humphrey, Tunbridge Wells, England

Application June 1, 1934, Serial No. 728,609
In Great Britain June 13, 1933

5 Claims. (Cl. 55—148)

The kind of weed extractors in present use is of the rigid type, having a cutting edge which is pressed into the ground and on being withdrawn removes from the ground a cylinder of earth of practically uniform section containing the weed and root or portions thereof. The cutting edge is usually circular and any single apparatus cuts always the same diameter hole in the ground irrespective of the size of the weed or the nature of its root. This limitation has great disadvantages for in most cases the apparatus cuts out either too much or too little earth and the cylindrical piece of earth removed rarely conforms to the economical shape required to remove any particular weed and its roots with the minimum of attached earth.

According to my invention, I employ two or more cutting members attached to a frame, provided with a handle or handles or otherwise adapted to receive downwardly applied pressure to cause the cutting members to penetrate the ground. The cutting members are mounted so that they converge as they penetrate the earth and thus enclose a tapered plug of earth containing the weed etc., the converging movement being a free movement caused solely by the reaction of the soil, or a constrained movement imposed by the mechanism of the frame or by both the frame mechanism and the soil reaction. In any case each cutting member follows a path in the earth which is a smooth continuation of the cutting surface and the earth enclosed between the cutting members is not substantially compressed. It will be evident that this arrangement ensures that a clean cutting action is obtained and, on lifting the tool after the cutting members have converged to the desired extent, the weed is extracted with practically no disturbance of the surrounding soil. The taper plug of earth represents the practical minimum of soil to be removed that is consistent with efficient eradication. The cutting members need not move together although as a rule this is the most convenient arrangement.

The cutting members may be of various shapes, e. g. they may have plane or curved surfaces, with or without perforations or prongs. Generally segments of a hollow cone, for example half cones, provide suitable cutting members, and may be arranged so that when they have completely converged in the ground their edges register along their whole length. The depth to which the cutters penetrate the soil is determined by the angle of the cone and the distance apart of the points of the cutters when they start to penetrate the ground.

One member may be rigidly attached to the frame and the other member caused to converge towards it or both members may have movements relatively to the frame. Means may be provided for giving a rotational movement to the members for the purpose of more readily freeing the portion of earth to be removed from the adjacent earth or for cutting or tearing away the weed roots. Means are also provided for holding the members in any relative positions during portions of a complete operation and also for returning the members to the positions required for commencing a new cycle of operations. Means of facilitating the ejection of the removed earth and weed may be also included.

Typical examples of my invention will now be described with reference to the accompanying drawing in which Fig. 1 shows an elevation of one form of apparatus embodying the invention, Fig. 2 shows an elevation of another form, Fig. 3 shows three forms of cutters in plan, and Fig. 3$^a$ shows these cutters in side elevation.

In Figure 1 the semi-conical cutters 1$^a$ and 2$^a$ are carried by the tubes 3$^a$ and 4$^a$ which are hinged at 5$^a$ and provided with handles 6$^a$ and 7$^a$. The points of the cutters are placed on the ground so that the weed to be excavated is between them and pressure on the handles forces the cutters into the ground. The resistance of the earth causes the cutters to converge until they meet, and it will be noted that the cutters follow substantially the path of least resistance to penetration. As the cutters 1$^a$ and 2$^a$ are fixed to the tubes 3$^a$ and 4$^a$, and the latter are hinged at 5$^a$, the path of the cutters will deviate from the path of least resistance to the extent of a few degrees, but this is immaterial as far as the action of the tool is concerned. The rod 8$^a$ is fixed to tube 4$^a$ but passes through a hole in tube 3$^a$ and carries a nut 9$^a$ which limits the movement of tube 3$^a$ away from tube 4$^a$. A thin wedge 10$^a$ passes through a slot in rod 8$^a$ and is pressed downwards by a spring so that as the cutters converge the wedge moves downwards and prevents the cutters from separating until the excavated weed has to be released when the wedge is pulled upwards by the knob 11$^a$. The apparatus is shown fitted with a weed ejector. By pressing the small handle 12$^a$ downwards the spring separated parts 13$^a$ and 14$^a$, attached to sliding sleeve 15$^a$ and moved downwards by rod 16$^a$, engage any weed or earth which may stick to the cutters and eject it.

In Figure 2 the semi-conical cutters 1 and 2 are carried by the tubes 3 and 4 which are hinged at 5 and 6 to a cross bar 7 rigidly fastened to a central tube 8 at the top of which is fixed the operating handle 9. The points of the cutters are opened to the desired distance and placed on the ground with the weed to be excavated between them and downward pressure on the handle forces the cutters into the earth. As the cutters are free to follow the path of least resistance to penetration the resistance of the earth causes the cutters to converge till they meet. On lifting the apparatus a cone of earth containing the weed is removed from the ground. A metal strip 10 rides across the rectangular tubes 3, 4 and 8 and is connected to a similar strip at the opposite side of the tubes by the two pairs of pins 11 and 12. These pins control the distance between tubes 3 and 4 which are pressed apart by springs 13 and 14 attached to the ejector blades 15 and 16, which are pivotally connected to and between strips 10. The vertical position of the strip 10 is controlled by the handle 17 which is connected through a slot in tube 8 to a rod 18 inside the tube which rod joins handle 17 and strip 10 rigidly together, suitable means, such as lateral indentations in the slot, being provided to maintain the handle in any adjusted position. Another slot 19 in tube 8 accommodates a suitable connection between rod 18 and strip 10. A long vertical spiral spring (not shown) inside tube 8 stretched between the points 20 and 21 tends to raise strip 10 so that as the cutters 5 and 6 converge the strip rises upwards thus keeping pins 11 and 12 pressed against the fins 22 and 23, fixed to tubes 3 and 4 respectively. Cutters 1 and 2 are in this manner held closed until the weed has to be ejected. By moving handle 17 and strip 10 downwards the pins 11 and 12 move down the inclined fins until they reach the bottom of the fins and at this point tubes 3 and 4 are allowed to be pressed apart to their widest opening. Already the ejector blades have commenced to push or scrape the earth and weed from the cutters and further downward motion of handle 17 completes the ejection. Handle 17 is now raised until strip 10 reaches a position which limits the distance between the cutters to that desired for starting a fresh cycle. As in the case of Figure 1, the cutters deviate slightly from the path of least resistance, owing to the fact that the hinges 5 and 6 are not free to converge. The extent of the deviation depends upon the vertical distance between these hinges and the points of the cutters, and can be reduced to a negligible amount.

The shapes of the cutters in Figures 1 and 2 are shown as straight-sided cones because the relation between the distance of the pivot from the cutters is a multiple of the length of the cutters, and also the disposition of the cutter-arms (so that they are vertical half-way through the cutting stroke) leads to a theoretical shape of cutters which is so close to a straight-line cone that the breadth of an ink-line covers the curve in the case of Figure 1 and almost covers the curve in Figure 2. In practice the cones are made straight-sided as the practical results in the two examples illustrated are identical with those of theoretically shaped cutters.

Cutters may take various shapes three suitable forms being shown in Figures 3 and 3ª, where all have the same elevation but in plan are half-cone, angle and rectangle respectively. Cutters may be constructed as forks with prongs either straight or bent, the latter being for cutters which are hinged. So far cutters have been shown converging till they meet but cutters may be made with projections or advanced cutting edges which overlap, it being understood that such advanced edges on one cutter are opposed to spaces in the other cutter. With cutters built up of prongs the overlap may be considerable, the prongs of one cutter passing through the spaces of the other cutter.

The common feature in the examples herein described is that they operate with the least displacement of the earth. When any solid body is introduced into the earth a displacement of the earth to make room for the body is essential and is accompanied by a small compression of the earth. Neglecting this unavoidable displacement and compression my invention enables converging cutters to operate without involving appreciable further displacement or compression and the operation may be characterized in a number of ways some of which I will now state.

(1) The work done against the resistance of the earth is a minimum.

(2) The cutters converge so as to enclose a tapered plug of earth containing the weed, etc., without substantially compressing the said plug or disturbing the surrounding earth.

(3) The cutters converge so as to enclose a tapered plug of earth and the path described by the leading edge on point of each cutter is closely followed by the remainder of the cutter so as to minimize the displacement of earth.

(4) The cutters follow the line of least resistance in their path through the earth.

I claim:—

1. Apparatus for extracting weeds, roots and the like from the ground, comprising two vertical members carrying cutters at their lower ends and hinged together at their upper ends and provided with handles, means for preventing the cutters from separating during a cutting cycle and means for opening the cutters and ejecting the weed, said cutters being mounted so that they converge as they penetrate the ground and thus enclose a tapered plug of earth containing the weed, each cutter following a path in the ground which is substantially a smooth continuation of the cutting surface so that the soil enclosed between the cutters is not substantially compressed and also the surrounding earth is not disturbed.

2. Apparatus for extracting weeds, roots or the like from the ground, comprising a central vertical member attached to a handle, a cross bar rigidly fixed to the central member, cutters attached to two members which are pivotally connected to the cross bar, a second handle rigidly attached to a member positioned at right angles to the central member which limits the distance between the two said members according to its vertical position and which carries ejector blades, the second handle and attached member being adapted to fix the distance between the cutters to that desired for any particular cycle and prevent the cutters separating during a cutting cycle, said cutters being mounted so that they converge as they penetrate the ground and thus enclose a tapered plug of earth containing the weed, each cutter following a path in the ground which is substantially a smooth continuation of the cutting surface so that the soil enclosed between the cutters is not substantially compressed and also the surrounding earth is not disturbed.

3. Apparatus for extracting weeds, roots and the like, comprising a central vertical member rigidly attached to a frame comprising symmetrically depending pivoted arms provided with inclined planes and carrying cutting members at their lower extremities, a sliding collar adapted to engage said planes and thereby limit the distance apart of said arms, said collar being fixed to a vertical sliding member associated with the central vertical member, means for locating said sliding member in a number of definite positions relative to said central vertical member, said cutting members being adapted simultaneously to penetrate the ground and to converge substantially without compressing the earth between them.

4. Apparatus for extracting weeds, roots and the like from the ground comprising a pair of wedge-shaped cutting members mounted respectively at the end of and in line with a pair of relatively long arms pivoted in fixed relation at their ends remote from the said cutting members, said arms being close together and substantially parallel and being associated with means for exerting downward pressure upon said cutting members to cause same to simultaneously penetrate the ground and converge as a result of their wedge shape and the reaction of the soil.

5. Apparatus for extracting weeds, roots and the like from the ground, comprising at least two semi-conical cutting members, and means mounting said cutting members and adapted to receive and transmit downwardly applied pressure equally to said cutting members to cause the cutting members to simultaneously penetrate the ground, the said cutting members being mounted so that they form an acute angle therebetween and automatically converge as the result of their angular mounting as they penetrate the ground and thus enclose a tapered plug of earth containing the weed, each cutting member following a path in the ground which is substantially a smooth continuation of the cutting surface so that the soil enclosed between the cutting members is not substantially compressed and also the surrounding earth is not disturbed.

HERBERT ALFRED HUMPHREY.